(12) United States Patent
Nakagawa et al.

(10) Patent No.: US 10,478,774 B2
(45) Date of Patent: Nov. 19, 2019

(54) DENITRATOR

(71) Applicant: MITSUBISHI HEAVY INDUSTRIES, LTD., Tokyo (JP)

(72) Inventors: Keiichi Nakagawa, Tokyo (JP); Mikiya Sakurai, Tokyo (JP); Kiyoto Itakura, Tokyo (JP); Hitoshi Tokunaga, Tokyo (JP); Naoya Okuzumi, Tokyo (JP); Hirokazu Tsutsumi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/065,697

(22) PCT Filed: Nov. 11, 2016

(86) PCT No.: PCT/JP2016/083528
§ 371 (c)(1),
(2) Date: Jun. 22, 2018

(87) PCT Pub. No.: WO2017/110292
PCT Pub. Date: Jun. 29, 2017

(65) Prior Publication Data
US 2018/0369749 A1 Dec. 27, 2018

(30) Foreign Application Priority Data
Dec. 25, 2015 (JP) ................. 2015-254624

(51) Int. Cl.
*B01D 53/56* (2006.01)
*B01D 53/76* (2006.01)
*F23J 15/00* (2006.01)

(52) U.S. Cl.
CPC ............. *B01D 53/56* (2013.01); *B01D 53/76* (2013.01); *F23J 15/00* (2013.01); *F23J 15/003* (2013.01);
(Continued)

(58) Field of Classification Search
None
See application file for complete search history.

(56) References Cited

U.S. PATENT DOCUMENTS

| 6,258,336 B1 | 7/2001 | Breen et al. |
| 6,280,695 B1 | 8/2001 | Lissianski et al. |
| 2005/0051067 A1* | 3/2005 | Marx .................. F23J 7/00 110/345 |

FOREIGN PATENT DOCUMENTS

| JP | H06-98269 B2 | 12/1994 |
| JP | 2001-187315 A | 7/2001 |

OTHER PUBLICATIONS

Office Action in corresponding Danish Application No. PA 2018 70420, dated Mar. 8, 2019 (9 pages).

* cited by examiner

*Primary Examiner* — Jelitza M Perez
(74) *Attorney, Agent, or Firm* — Osha Liang LLP

(57) ABSTRACT

A denitrator removes nitrogen oxide in a flue gas generated from a combustion furnace by injecting a reducing agent into the flue gas. The denitrator includes a housing disposed above the combustion furnace. The housing includes a discharge port for the flue gas at one end of the housing. A cross-sectional area of flow of the flue gas gradually increases toward the discharge port. The housing gathers and guides the flue gas to the discharge port. The denitrator injects the reducing agent in another end of the housing.

6 Claims, 3 Drawing Sheets

(52) U.S. Cl.
CPC ...... *F23J 15/006* (2013.01); *B01D 2251/2062* (2013.01); *B01D 2257/404* (2013.01); *B01D 2258/0283* (2013.01)

DENITRATOR

TECHNICAL FIELD

The present invention relates to a denitrator, and more specifically, relates to a denitrator for removing nitrogen oxide in flue gas generated from a combustion furnace by injecting a reducing agent.

BACKGROUND

Various denitration techniques designed to reduce and transform NOx in flue gas into harmless $N_2$ by supplying ammonia gas have heretofore been proposed. It was known that an application temperature of these techniques generally falls in a range from 800 to 1000° C. If the ammonia gas is supplied to the flue gas at 1000° C. or above, the NOx is rather increased as a result of combustion of the ammonia gas. On the other hand, if the ammonia gas is supplied to the flue gas at 800° C. or below, the denitration does not progress properly due to a slow reduction reaction rate.

In order to carry out denitration, it is preferable to set an installation location of a nozzle for supplying the ammonia gas into the flue gas in a region where the flue gas having a temperature range from 800 to 1000° C. flows. Nonetheless, there is usually no room in this region because a group of heat exchangers is supposed to be installed thereat. It is therefore difficult to install the nozzle for supplying the ammonia gas in this region, and the nozzle would typically have to be installed in a space in another region where flue gas having a temperature of 1000° C. or above flows immediately after combustion.

REFERENCE DOCUMENT LIST

Patent Document

Patent Document 1: JP 2001-187315 A

Patent Document 1 discloses a denitrator in which numerous nozzles for supplying ammonia gas are installed in a space where flue gas having a temperature of 1000° C. or above likely flows immediately after combustion.

Although this denitrator can maintain a high denitration efficiency to some extent as a result of installation of the numerous nozzles, the denitrator has difficulty in further improving the denitration efficiency of the flue gas due to the aforementioned reason and the like.

SUMMARY

One or more embodiments of the invention provide a denitrator which is capable of improving the denitration efficiency more than ever before even when the nozzles are installed in a space in a combustion furnace where flue gas having a temperature of 1000° C. or above generally flows immediately after combustion.

A denitrator according to one or more embodiments of the present invention provides a denitrator for removing nitrogen oxide in flue gas generated from a combustion furnace by injecting a reducing agent, including a housing being provided above the combustion furnace, the housing including a discharge port for the flue gas at one end thereof and having a shape that a cross-sectional area of flow gradually increases toward the discharge port, the denitrator being configured to allow the housing to gather and guide the flue gas to the discharge port and being configured to inject the reducing agent in another end side of the housing.

In a denitrator according to one or more embodiments of the present invention, the housing may include a ceiling that is inclined downward from one end thereof toward another end thereof.

In addition, in a denitrator according to one or more embodiments of the present invention, the reducing agent may include ammonia gas, and the ammonia gas may be injected into the flue gas such that the ammonia gas relative to a flow rate of the flue gas is up to 0.1 vol %, or preferably 0.01 to 0.06 vol %, in a case in which the flue gas has a temperature of at least 1000° C.

Furthermore, in a denitrator according to one or more embodiments of the present invention, the ammonia gas may be injected into the flue gas in a first region on the other end side which accounts for at most 50% of an amount of the flue gas in the housing, and at least 50% of an amount of the ammonia gas to be injected into the flue gas may be injected in a second region on the other end side, which accounts for at most 30%, or preferably at most 20% of the amount of the flue gas in the housing.

Moreover, in a denitrator according to one or more embodiments of the present invention, a flow velocity of injecting the ammonia gas to be supplied may be set in a range from 100 to 2000 Nm/s, or preferably a range from 300 to 1000 Nm/s.

In a denitrator according to one or more embodiments of the present invention, nitrogen may be injected simultaneously with and from the same position as the ammonia gas.

In a denitrator according to one or more embodiments of the present invention, an amount of supply of the nitrogen may be 0.1 to 5 times, or preferably 0.5 to 2 times, as large as an amount of supply of the ammonia gas.

According to one or more embodiments of the present invention, there is provided a denitrator for removing nitrogen oxide in flue gas generated from a combustion furnace by injecting a reducing agent, including a housing being provided above the combustion furnace, the housing including a discharge port for the flue gas at one end thereof and having a shape such that a cross-sectional area of flow gradually increases toward the discharge port, the denitrator being configured to allow the housing to gather and guide the flue gas to the discharge port and being configured to inject the reducing agent in another end side of the housing, and thus, even in a case in which the nozzles discussed above are installed in a region from a combustion furnace where flue gas having a temperature of 1000° C. or above generally flows immediately after combustion, it is possible to reduce the temperature of the flue gas by using the reducing agent from the upstream side down to a temperature range suitable for the denitration, thereby improving denitration efficiency more than ever before.

DETAILED DESCRIPTION

Figure 1:
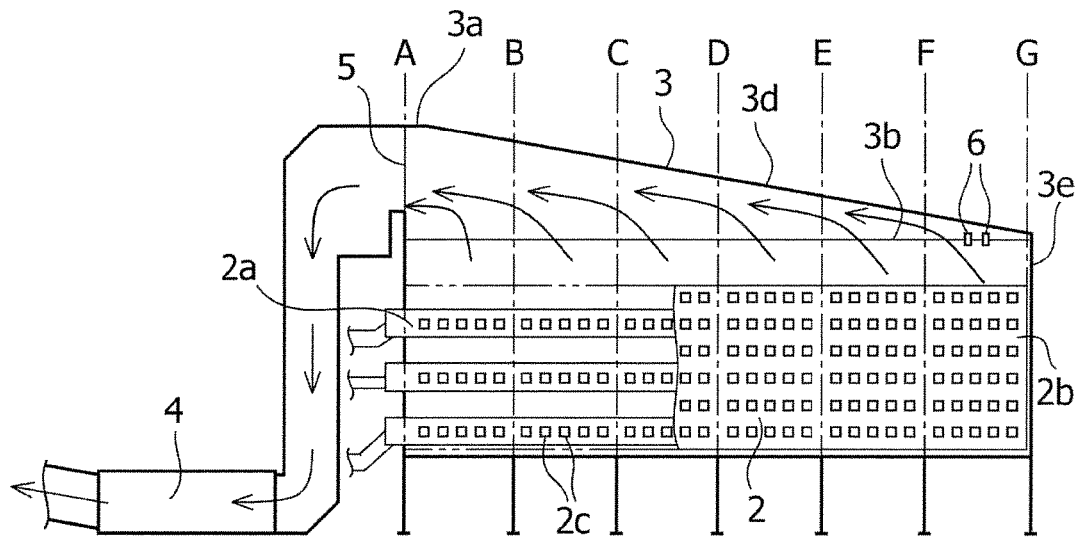
FIG. 1 is a cross-sectional view depicting a denitrator according to one or more embodiments of the present invention, which shows a state of installing the denitrator above the combustion furnaces.

Hereinafter, a denitrator according to embodiments of the present invention will now be described in detail with reference to FIG. 1 to FIG. 4.

In a denitrator 1 in accordance with one or more embodiments, ammonia gas is used as a reducing agent. Nitrogen oxide in flue gas generated in combustion furnaces 2 is removed by injecting the ammonia gas.

The denitrator 1 includes a pair of combustion furnaces 2, 2 which are placed at an appropriate distance therebetween; and a housing 3 which is positioned above these combustion furnaces and covers the tops thereof. Each of the combustion furnaces 2 includes a plurality of burners 2c arranged in two or more lines from one end 2a to another end 2b of the combustion furnace (see FIG. 1 and FIG. 2).

The housing 3 includes a discharge port 5 at one end 3a of the housing, which discharges flue gas from the combustion furnaces 2 to a heat exchanger 4. In addition, as schematically shown in FIG. 2, the housing 3 is formed into a substantially hat shape in cross-sectional view, which includes shoulder parts 3b, 3b on two sides of the housing and a central part 3c projecting upward from the shoulder parts. Furthermore, the housing 3 is designed to incline a ceiling 3d of the central part 3c downward from the one end 3a to another end 3e of the housing such that a cross-sectional area of flow gradually increases toward the discharge port 5 (see FIG. 1 and FIG. 2).

Figure 2:
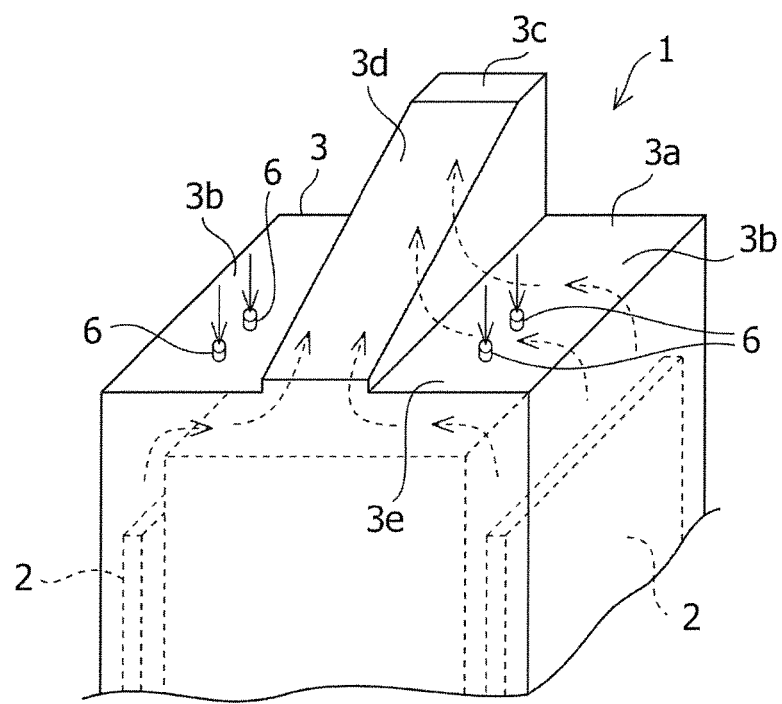
FIG. 2 is a perspective view schematically showing a substantial part of a denitrator according to one or more embodiments of the present invention.

Due to the aforementioned shape of the housing 3, the flue gas discharged from the combustion furnaces 2, 2 is gathered by the housing 3 located thereabove and is guided to the discharge port 5 along the inclination of the ceiling 3d, as indicated with arrows in FIG. 1.

Nozzles 6 for injecting and supplying the ammonia gas into the flue gas are arranged on the shoulder parts 3b, 3b on the two sides near the other end 3e of the housing 3. For ease of description hereinbelow, the housing 3 will be divided evenly into six regions from the one end 3a to the other end 3e and the boundaries thereof will be denoted by A, B, C, D, E, F, and G, respectively (see FIG. 1).

Positions of the nozzles 6 to inject the ammonia gas are located in a region on a side of the other end 3e (i.e., from boundaries D to G in FIG. 1), which accounts for at most 50% of an amount of the flue gas in the housing 3. Furthermore, at least 50% of an amount of the ammonia gas to be injected into the flue gas is injected in a region on a side of the other end 3e (i.e., from a position between boundaries E and F to boundary G in FIG. 1), which accounts for at most 30% or preferably at most 20% of the amount of the flue gas in the housing 3.

FIG. 2 illustrates an example according to one or more embodiments in which the positions of the nozzles 6 are arranged at the shoulder parts 3b on the other end 3e side of the housing 3. By way of example, FIG. 2 illustrates a case of arranging two combustion furnaces 2 together with reaction tubes (not shown). As is apparent from FIG. 2, the denitrator 1 in accordance with one or more embodiments is configured to allow the single housing 3 to straddle and cover the tops of two combustion furnaces 2, 2.

An operation of the denitrator 1 in accordance with one or more embodiments will be described.

As indicated by arrows in FIG. 1, in this denitrator 1, the flue gas from the combustion furnaces 2 drifts up into the housing 3 while retaining a temperature at about 1000° C. or above, and then the flue gas flows toward the discharge port 5 along the ceiling 3d. In this case, the ammonia gas is injected into the flue gas from the nozzles 6 located on the other end 3e side, that is, on the upstream side of the housing 3. The amount of supply of the ammonia gas in this instance preferably corresponds to 0.1 vol % at a maximum relative to the flow rate of the flue gas passing the discharge port 5. In this instance, the ammonia gas is injected to the upstream side of the flue gas. As a consequence, the ammonia gas spreads in a wide range along with the flow of the flue gas to the downstream side being the one end 3a side of the housing 3, so that the ammonia gas can achieve an effect of cooling the flue gas over the wide range and the NOx in the flue gas can be reduced at high efficiency.

More specifically, the amount of the flue gas is low on the upstream side of the flue gas in the denitrator 1. Accordingly, even when the proportion of the ammonia gas relative to the entire amount of the flue gas is small, the proportion of the ammonia gas becomes higher in the region on the upstream side so that the effect of cooling the flue gas on the upstream side can be obtained. In the meantime, a flow velocity of the flue gas is low on the upstream side and the ammonia gas supplied thereto is not mixed soon. Accordingly, the ammonia gas spreads into the flue gas in the housing 3 along with the flow of the ammonia gas to the downstream side. Thus, the group of low-temperature ammonia gas reduces the temperature of the flue gas in a wide range so that the ammonia gas enables the reduction of the NOx in the flue gas to progress efficiently. According to the method using this device, denitration efficiency is around 15% (10% to 20%).

Furthermore, in one or more embodiments, when the flue gas has a temperature of 1000° C. or above, the ammonia gas is injected into the flue gas such that the ammonia gas relative to a flow rate of the flue gas is up to 0.1 vol % at a maximum. A flow velocity of injecting the ammonia gas to be supplied is set in a range from 100 to 2000 Nm/s or preferably in a range from 300 to 1000 Nm/s. In this way, it is possible to achieve the partial cooling effect of the flue gas and to obtain the denitration effect at high efficiency.

Here, if the injection rate of the ammonia gas into the flue gas is equal to or above 2000 Nm/s, the ammonia gas spreads in a wide range and fails to achieve the partial cooling effect and the temperature remains high. As a consequence, the denitration effect is hardly obtained and the NOx is rather increased. On the other hand, if the injection rate of the ammonia gas into the flue gas is equal to or below 100 Nm/s, the concentration of the ammonia gas becomes locally high, whereby the NOx reduction reaction is limited and a sufficient denitration efficiency is not achieved.

Meanwhile, nitrogen may be supplied simultaneously with the supply of the ammonia gas and from the same position as the nozzles 6 for the ammonia gas. In this way, nitrogen can suppress a rise in temperature of the group of the ammonia gas, and a concentration of oxygen around the group of the ammonia gas is reduced at the same time. Thus, it is possible to inhibit this ammonia from turning into NOx. Here, the amount of supply of nitrogen is set preferably in a range from 0.1 to 5 times or more preferably in a range from 0.5 to 2 times as large as the amount of supply of the ammonia gas.

It is to be noted that no effect is achieved if the amount of supply of nitrogen is 0.1 times or less than the amount of supply of ammonia. On the other hand, if this ratio is 5 times or more, the chance of contact with the NOx is reduced and no reaction will take place. In addition, the latter case requires a large amount of nitrogen and is therefore uneconomical.

Figure 3:
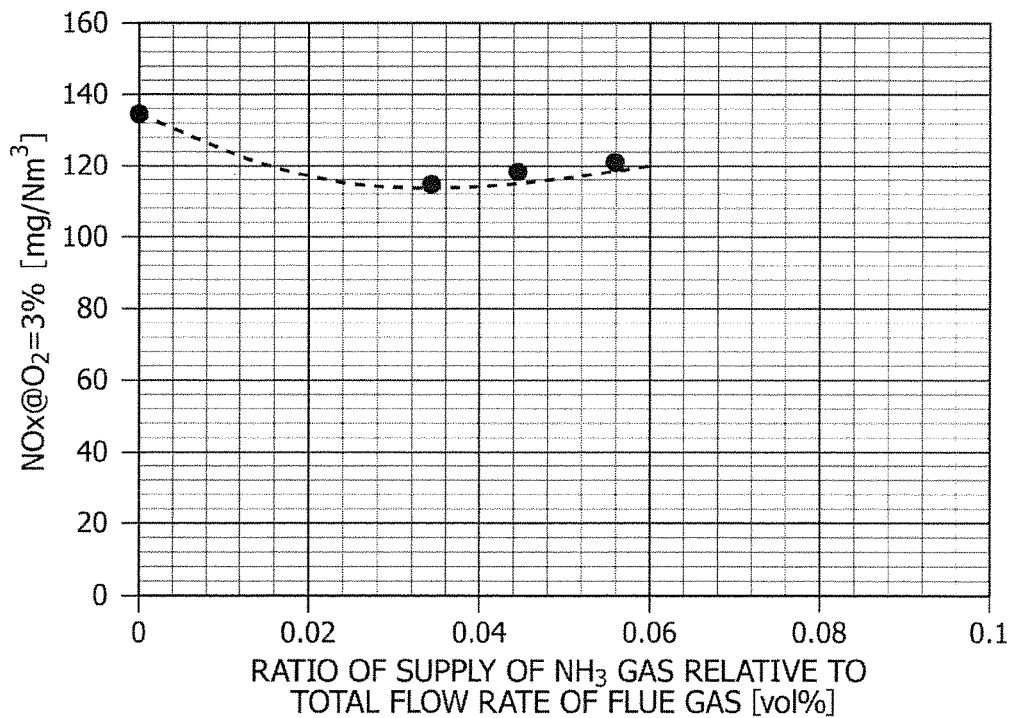
FIG. 3 is a graph representing denitration effects of a denitrator according to one or more embodiments of the present invention, which shows a relationship between an amount of supply of ammonia gas and a concentration of NOx in the flue gas under the conditions that flue gas has an oxygen concentration of 3%.

Examples showing a NOx removal effect of by this denitrator 1 will be described with reference to FIG. 3 and FIG. 4. FIG. 3 shows a relationship between the amount of supply of the ammonia gas and the concentration of the NOx under the conditions that the flue gas has an oxygen concentration of 3%, in which the amount of supply of nitrogen in the upstream side region F to G of the denitrator 1 is set to 0.04 vol % relative to the total flue gas flow rate under the condition of the flue gas temperature at 1055° C.

FIG. 3 reveals that the NOx concentration is reduced by supplying the ammonia gas, which is effective in particular in the range from 0.01 to 0.06 vol %.

Figure 4:
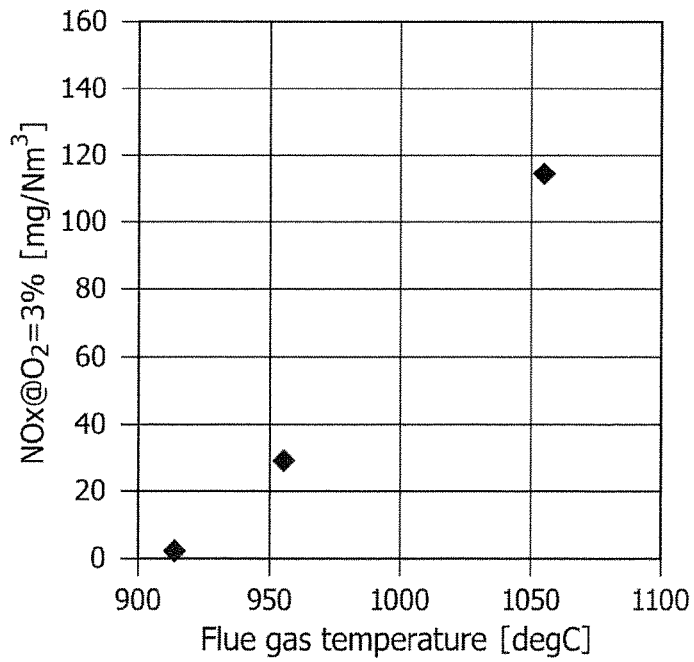
FIG. 4 is a graph representing denitration effects of a denitrator according to one or more embodiments of the present invention, which shows a relationship between a temperature of flue gas and a concentration of NOx in the flue gas under the conditions that flue gas has an oxygen concentration of 3%.

FIG. 4 shows a relationship between the temperature of the flue gas and the concentration of the NOx under the condition that the flue gas has an oxygen concentration of 3%, in which the supply amount ratio of ammonia gas in the upstream side region F to G of the denitrator 1 is set to 0.035 vol %. FIG. 4 reveals that, despite the flue gas temperature being at 1055° C., the concentration of the NOx can be reduced to 115 mg/NM3, which is about 15% lower than 134 mg/NM3 in the case of not supplying the ammonia gas in FIG. 3.

Figure 5:
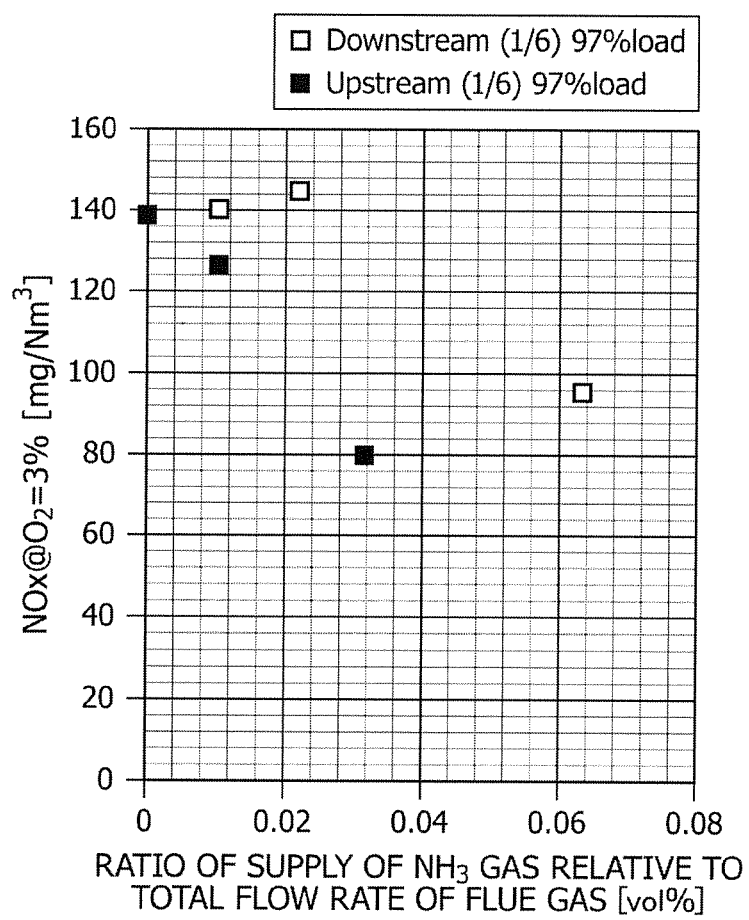
FIG. 5 is a graph representing denitration effects of a denitrator according to one or more embodiments of the present invention, which shows a relationship between a ratio of a supply amount of ammonia gas to a flow rate of flue gas and a concentration of NOx in the flue gas under the conditions that the flue gas has an oxygen concentration of 3%.

FIG. 5 shows a relationship between the supply amount ratio of ammonia gas and the concentration of NOx under the condition that the flue gas has an oxygen concentration of 3%, in which the amounts of supply of nitrogen in the upstream side region F to G (i.e., Upstream) or a region A to B (i.e. Downstream) of the denitrator 1 are each set to 0.04 vol % relative to the total flue gas flow rate when the flue gas temperature is equal to about 1000° C. FIG. 5 reveals that an NOx removal rate is higher in the case of supplying the ammonia gas to the upstream side than in the case of supplying the ammonia gas to the downstream side, and that when the ammonia gas is supplied to the downstream side, the temperature of the flue gas mixed with the ammonia gas remains high due to the large amount of the gas, thus leading to generation of the NOx as a consequence.

In one or more embodiments shown in FIG. 2, the denitrator 1 is provided with two combustion furnaces 2 and is configured to cover the tops of the these combustion furnaces 2 with the single housing 3. However, the present invention is not limited to this configuration, and it is by all means possible to cover three or more combustion furnaces 2 or only one combustion furnace 2 with the housing 3.

In one or more of the above-described embodiments, the denitrator is applied to the combustion furnaces for heating the reaction tubes. However, the present invention is not limited to this configuration. One or more embodiments of the present invention are also applicable to any combustion furnace as long as it is a combustion furnace such as a garbage incinerator, which requires the NOx reduction. In short, such a combustion furnace only needs to be configured to be able to supply the ammonia gas to a far side of the housing from the discharge port of the flue gas.

REFERENCE SYMBOL LIST 1 denitrator
2 combustion furnace
2a one end
2b another end
2c burner
3 housing
3a one end
3b shoulder part
3c central part
3d ceiling
3e other end
4 heat exchanger
5 discharge port
6 nozzle Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A denitrator for removing nitrogen oxide in flue gas generated from a combustion furnace by injecting a reducing agent into the flue gas, the denitrator comprising:
a housing disposed above the combustion furnace,
wherein the housing comprises a discharge port for the flue gas at one end of the housing,
wherein a cross-sectional area of flow of the flue gas gradually increases toward the discharge port,
wherein the housing gathers and guides the flue gas to the discharge port,
wherein the denitrator injects the reducing agent into another end of the housing, and
wherein the housing comprises a ceiling that is inclined downward from the one end toward the another end.

2. The denitrator according to claim 1,
wherein the reducing agent comprises ammonia gas, and
wherein the denitrator injects the ammonia gas into the flue gas, and
wherein, when the flue gas has a temperature of at least 1000° C., the ammonia gas relative to a flow rate of the flue gas is not more than 0.1 vol %, or in a range of 0.01 to 0.06 vol %.

3. The denitrator according to claim 2, wherein
the denitrator injects the ammonia gas into the flue gas in a first region on the another end that accounts for at most 50% of the flue gas in the housing, and
at least 50% of the ammonia gas is injected in a second region on the another end that accounts for at most 30% of the flue gas in the housing.

4. The denitrator according to claim 3, wherein a flow velocity of injecting the ammonia gas is in a range from 100 to 2000 Nm/s.

5. The denitrator according to claim 4, wherein the denitrator injects nitrogen simultaneously with and from the same position as the ammonia gas.

6. The denitrator according to claim 5, wherein an amount of supply of the nitrogen is 0.1 to 5 times as large as an amount of supply of the ammonia gas.

* * * * *